United States Patent Office 3,321,549
Patented May 23, 1967

3,321,549
THERMOPLASTIC POLYHYDROXYETHERS MODIFIED BY THE ADDITION OF A BLEND OF AN EPOXY RESIN AND AN AMINE BLOCKED POLYISOCYANATE
Bruce P. Barth, Bound Brook, N.J., assignor to Union Carbide Corporation, a corporation of New York
No Drawing. Filed June 15, 1964, Ser. No. 375,340
19 Claims. (Cl. 260—830)

This invention relates to modified thermoplastic polyhydroxyethers and more particularly to stable one-package compositions which can be readily converted to cured or crosslinked polyhydroxyethers.

Polyisocyanates are effective crosslinking agents for thermoplastic polyhydroxyethers. However, mixtures of these compounds react so rapidly even at room temperature that they must be handled as two-part or two-package systems. Such systems are less desirable than one package systems because the two components must be mixed shortly before use due to their short pot lives. The pot life of such systems is generally so short that premature curing often takes place before application of the mixture to a particular substrate is completed. Dilution of the components with a solvent serves to slow down their interaction but the original problem appears when the solvent is removed. Solvents also introduce new problems as for example, larger storage volume requirements and the difficulties accompanying complete removal of solvents from the reactants prior to crosslinking. Solvent residues are notoriously effective in weakening adhesive bonds and forming pock marks or voids in crosslinked coatings.

It is, therefore, an object of this invention to provide a curable polyisocyanate-thermoplastic polyhydroxyether composition in a stable, 100% solids, one-package system.

It is another object to provide a curable polyisocyanate thermoplastic polyhydroxyether composition capable of being cured to a heat resistant structural adhesive.

It is another object to provide a curable polyisocyanate thermoplastic polyhydroxyether composition which can be cured to a solvent resistant coating.

Other objects of the invention will become apparent to those skilled in the art upon an examination of the detailed description below.

It has now been discovered that these and other objects are achieved in accordance with the present invention by a curable thermoplastic polyhydroxyether composition comprising:

(1) A curable thermoplastic polyhydroxyether having the structure:

$$\{D\!-\!O\!-\!E\!-\!O\}$$

wherein D is the radical residuum of a dihydric phenol, E is an hydroxyl containing residuum of an epoxide, and $n$ represents the degree of polymerization and is at least 30;

(2) A curing amount of an amine blocked polyisocyanate;

(3) A stoichiometric amount of an epoxy resin based on the weight of amine blocked polyisocyanate.

This composition when applied to adherends and cured affords a heat resistant structural adhesive bond between the adherends having considerable tensile strength at temperatures even as high as about 250 F. This adhesive property also makes possible the use of this composition as a protective heat resistant coating which by virtue of its crosslinked state is also tough as well as solvent resistant.

The term "thermoplastic polyhydroxyether" herein refers to substantially linear polymers having the general formula $$\{D\!-\!O\!-\!E\!-\!O\}$$

wherein D is the radical residuum of a dihydric phenol, E is an hydroxyl containing radical residuum of an epoxide, and $n$ represents the degree of polymerization and is at least 30 and is preferably 80 or more. Polyhydroxyethers having melt flows of less than about 7.0 determined as hereinafter described are preferred.

The dihydric phenol contributing the phenol radical residuum, D, can be either a dihydric mononuclear phenol such as hydroquinone and resorcinol or a dihydric polynuclear phenol such as those having the general formula

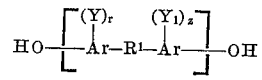

wherein Ar is an aromatic divalent hydrocarbon such as naphthylene and, preferably, phenylene, Y and $Y_1$ which can be the same or different and alkyl radicals, preferably having from 1 to 4 carbon atoms, halogen atoms, i.e., fluorine, chlorine, bromine, and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced and substituents and $R^1$ is a bond between adjacent carbon atoms as in dihydroxydiphenyl or is a divalent radical including, for example,

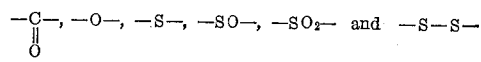

hydrocarbon radicals such as alkylene, alkylidene, cycloaliphatic e.g., cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R_1$ can be polyalkoxy, or polysiloxy to two or more alkylidene radicals separated by an aromatic ring, a tertiary amino group, an ether linkage, a carbonyl group or a sulfur containing group such as sulfoxide, and the like.

Examples of specific dihydric phenols include among others:

The bis(hydroxyphenyl)alkanes such as
2,2-bis(4-hydroxyphenyl)propane,
2,4′-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylamine,
bis(4-hydroxyphenyl)cyclohexylmethane,
1,2-bis(4-hydroxyphenyl)-1,2-bis(phenyl)propane,
2,2-bis(4-hydroxyphenyl)-1-phenyl-propane and the like;

Di(hydroxyphenyl)sulfones such as bis(4-hydroxyphenyl)sulfone, 2,4′-dihydroxydiphenyl sulfone, 5′-chloro-2,4′-dihydroxydiphenyl sulfone, 5′-chloro-4,4′-dihydroxydiphenyl sulfone and the like;

Di(hydroxyphenyl)ethers such as bis(4-hydroxyphenyl)ether, the 4,3′- 4,2′- 2,2′- 2,2′-, dihydroxydiphenyl ethers, 4,4′-dihydroxy-2,6-dimethyldiphenyl ether, bis(4-hydroxy-3-isobutylphenyl)ether, bis(4-hydroxy-3 - isopropylphenyl)ether, bis(4 - hydroxy - 3 - chlorophenyl)ether, bis(4-hydroxy-3 - fluorophenyl)ether, bis(4 - hydroxy - 3-bromophenyl)ether, bis(4-hydroxynaphthyl)ether, bis(4-hydroxy-3-chloronaphthyl)ether, bis(2-hydroxydiphenyl) ether, 4,4'- dihydroxy-2,6-dimethoxydiphenyl ether, 4,4'-dihydroxy-2,5-diethoxydiphenyl ether, and the like.

Also suitable are the bisphenol reaction products of 4-vinylcyclohexene and phenols, e.g., 1,3-bis(hydroxyphenyl)-1-ethylcyclohexane, and the bisphenol reaction products of dipentene or its isomers and phenols such as 1,2-bis(p-hydroxyphenyl)-1 - methyl - 4 - isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

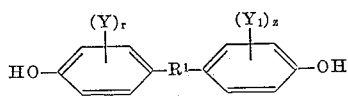

wherein Y and $Y_1$ are as previously defined, r and z have values from 0 to 4 inclusive, and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The thermoplastic polyhydroxyether used was prepared by the reaction of equimolar amounts of 2,2-bis(4-hydroxyphenyl)propane and epichlorohydrin together with sodium hydroxide. Equipment used was provided with a sealed stirrer, thermometer and reflux condenser. There was placed therein:

| | Parts |
|---|---|
| 2,2-bis(4-hydroxyphenyl)propane | [1] 114.5 |
| Epichlorohydrin (99.1%) pure | [1] 46.8 |
| Ethanol | 96.0 |
| Butanol | 10.0 |
| Sodium hydroxide (97.5%) pure | 22.6 |
| Water | 70.0 |

[1] (0.5 mole.)

The above mixture was stirred at room temperature for 16 hours to accomplish the initial coupling reaction. The mixture was then heated at 80° C. for an hour. Sixty milliliters of a 7:3 mixture of toluene:butanol was added. Heating of the mixture at 80° C. was continued another two hours. There was added an additional 50 parts of the 7:3 toluene:butanol mixture and 4.5 parts of phenol. The contents of the vessel were continued heated at 80° C. (reflux) for 2½ hours. Upon cooling, the reaction mixture was cut with 200 parts of the 7:3 toluene:butanol mixture. One hundred parts of water was added and agitated with the contents to dissolve salts present in the reaction mixture. The vessel contents were allowed to settle for ten minutes during which time a lower brine phase formed. This lower phase was separated by decantation. The upper polymer solution containing phase was washed successively with two 160 part portions of water containing 4.5% butanol. The washed polymer solution was acidified by stirring the solution with a mixture of 1 part of 85% phosphoric acid with 100 parts of water (pH=2) for one hour. The upper polymer solution phase was again separated by decantation and water washed with four successive 200 part portions of water containing 4.5% butanol. The washed polymer was then coagulated in 1,000 parts of isopropanol, filtered and dried. There was obtained a thermoplastic polyhydroxyether of 2,2-bis(4-hydroxyphenol)propane and epichlorohydrin having a melt flow of 7.0 decigrams per minute.

Thermoplastic polyhydroxyethers having melt flows between 0.5 and 20 and more particularly 2 to 7 provide excellent structural adhesives and coatings when cross-linked according to the present invention.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus,

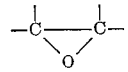

A monoepoxide contains one such oxirane group and provides a radical residuum E containing a single hydroxyl group; a diepoxide contains two such oxirane groups and provides a radical residuum E containing two hydroxyl groups. Saturated epoxides, by which term is meant diepoxides free of ethylenic unsaturation i.e., $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form part of an aliphatic hydrocarbon chain. Oxygen in such diepoxides can be, in addition to oxirane oxygen, ether oxygen $-O-$, oxacarbonyl oxygen

carbonyl oxygen

and the like.

Specific examples of monoepoxides include epihalohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexylmethyl) adipate, bis(3,4-epoxycyclohexylmethyl)- phthalate, 6-methyl-3,4-epoxycyclohexylmethyl, 6-methyl-3,4-epoxycyclohexane carboxylate, 2-chloro-2,4-epoxycyclohexylmethyl, 2 - chloro-3,4-epoxycyclohexanecarboxylate, diglycidyl ether, bis(2,3 - epoxycyclopentyl)ether, 1,5-pentanediol bis(6-methyl-3,4-epoxycyclohexylmethyl)ether, bis(2,3 - epoxy-2-ethylhexyl)adipate, diglycidyl maleate, diglycidyl phthalate, 3 - oxatetracyclo [4.4.0.1^{7,10}.0^{2,4}]-undec-8-yl 2,3-epoxypropyl ether, bis-(2,3 - epoxycyclopentyl)-sulfone, bis(3,4-epoxyhexoxypropyl)sulfone, 2,2'-sulfonyldiethyl bis(2,3-epoxycyclopentanecarboxylate), 3-oxatetracyclo [4.4.0.1^{7,10}.0^{2,4}] undec - 8-yl 2,3-epoxybutyrate, 4-pentenal-di(6-methyl-3,4-epoxycyclohexylmethyl)acetal, ethylene glycol bis (9,10 - epoxystearate), diglycidyl carbonate, bis(2,3 - epoxybutylphenyl)-2-ethylhexyl phosphate, diepoxydioxane, butadiene dioxide and 2,3-dimethyl butadiene dioxide. The preferred diepoxides are those wherein each of the oxirane groups is connected to an electron donating substituent which is not immediately connected to the carbon atoms of the oxirane group.

Such diepoxides have the grouping

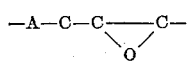

wherein A is an electron donating substituent such as

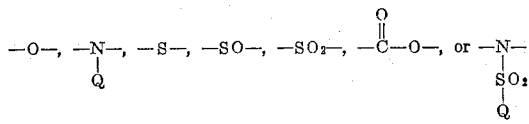

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

Melt flow of each of the thermoplastic polyhydroxyethers was determined by weighing in grams the amount of polyhydroxyether which, at a temperature of 220° C. and under a pressure of 44 p.s.i., flowed through an orifice having a diameter of 0.825" and a length of 0.315" over a ten minute period. Four such determinations were made and the average of the four determinations is reported as decigrams per minute under a pressure of 44 p.s.i. and at 220° C.

This composition is ideally suited as a one package formulation, due to the stability of the amine blocked polyisocyanate which is completely inert as a crosslinking or curing agent at normal storage temperatures since the amine and isocyanate functions are converted to a substituted urea:

This reaction is reversible at elevated temperatures. Thus, when the temperature of this composition is raised to about 400° F. or higher, the amine blocked polyisocyanate reverts to free amine and polyisocyanate allowing the latter to crosslink or cure the thermoplastic polyhydroxyether by reacting with pendant hydroxyl groups thereon. The epoxy resin reacts with free amine, thus removing amine as such from the cured adhesive bond or coating which enhances the strength of the bond. This reaction of course, also converts the epoxy resin into a cured resin, with adhesive properties of its own.

The polyisocyanates which are blocked with amines and used in the present invention are organic polyisocyanates containing two or more isocyanate groups. These organic polyisocyanates can be alkyl, cycloalkyl, aryl, aralkyl or alkaryl polyisocyanates. It is preferred to use aryl polyisocyanates where the —N=C=O groups are attached directly to different ring carbon atoms of the same or different aromatic nuclei. It is further preferred, to employ as the aryl polyisocyanate of this invention, aryl diisocyanates although triisocyanates or higher polyisocyanates can also be used, if preferred. For economic reasons, it is especially preferred to employ as the aryl diisocyanates, 2,4-diisocyanatotoluene or 2,4-tolylene diisocyanate (TDI) or dianisidine diisocyanate (3-methoxy-4-isocyanatobisphenyl).

As examples of other suitable polyisocyanates which are employed herein the amine blocked form can be mentioned
1,2-diisocyanatoethane,
1,3-diisocyanatopropane,
1,2-diisocyanatopropane,
1,4-diisocyanatobutane,
1,5-diisocyanatopentane,
1,6-diisocyanatohexane,
bis(3-isocyanatopropyl)ether,
bis(3-isocyanatopropyl)sulfide,
1,7-dissocyanatoheptane,
1,5-diisocyanato-2,2-dimethylpentane,
1,6-diisocyanato-3-methoxyhexane,
1,8-diisocyanatooctane,
1,5-diisocyanato-2,2,4-trimethylpentane,
1,9-diisocyanatononane,
1,10-diisocyanatodecane,
1,6-diisocyanato-3-butoxyhexane,
the bis(3-isocyanatopropyl)ether of 1,4-butylene glycol,
1,11-diisocyanatoundecane,
1,12-diisocyanatododecane,
bis(isocyanatohexyl)sulfide,
1,4-diisocyanatobenzene,
2,4-diisocyanatotoluene,
1,3-diisocyanato-o-xylene,
1,3-diisocyanato-m-xylene,
1,3-diisocyanato-p-xylene,
2,4-diisocyanato-1-chlorobenzene,
2,4-diisocyanato-1-nitrobenzene,
2,5-diisocyanato-1-nitrobenzene,
3,6-diisocyanato-1,4-dichlorobenzene,
2,5-diisocyanato-1-chloro-4-methoxybenzene,
2,5-diisocyanato-1-methoxy-benzene,
2,4-diisocyanato-1-methoxybenzene,
2,5-diisocyanato-1-methyl-4-methoxybenzene,
2,4-diisocyanato-1-ethylbenzene,
2,4-diisocyanato-1-ethoxybenzene,
4,6-diisocyanato-1,3-dimethoxybenzene,
2,5-diisocyanato-1,4-dimethoxybenzene,
2,4-diisocyanato-1-propylbenzene,
2,5-diisocyanato-1-propylbenzene,
2,4-diisocyanato-1-isobutylbenzene,
2,4-diisocyanato-1-isobutoxybenzene,
2,5-diisocyanato-1,4-diethoxybenzene,
1,3-diisocyanatocyclohexane
1,4-diisocyanatocyclohexane,
1,4-diisocyanatonaphthalene,
1,5-diisocyanatonaphthalene,
2,6-diisocyanatonaphthalene,
2,7-diisocyanatonaphthalene,
1-(isocyanatomethyl)-2-(3-isocyanatopropyl)3,5-dimethylcyclohexane,
1,3-bis(4-isocyanatophenyl)-propane,
α,β-bis(2-isocyanatoethyl)-9,10-endoethylene dihydroanthracene,
2,4-diisocyanato-1-methylcyclohexane,
2,4-diisocyanato-1-ethylcyclohexane,
bis(4-isocyanatocyclohexyl)methane,
1,1-bis(4-isocyanatocyclohexyl)ethane,
2,2-bis(4-isocyanatocyclohexyl)propane,
bis(2-methyl-4-isocyanatohexyl)methane,
bis(3,5-dimethyl-4-isocyanatohexyl)methane,
1-isocyanatomethyl-4-isocyanatobenzene,
1-(2-isocyanatoethyl)-4-isocyanatobenzene,
1-(2-isocyanatoethyl)-3-isocyanatobenzene,
1-(3-isocyanatopropyl)-4-isocyanatobenzene,
1-(4-isocyanatobutyl)-4-isocyanatobenzene,
1,5-diisocyanatotetrahydronaphthalene,
4,4'-diisocyanatoazobenzene,
2-methyl-4,4'-diisocyanatoazobenzene,
4,4'-diisocyanato-1-naphthaleneazeobenzene,
2,4-diisocyanatodiphenyl ether,
dianisidene diisocyanate,
ethylene glycol bis(4-isocyanatophenyl)ether,
diethylene glycol bis(4-isocyanatophenyl)ether,
2,2'-dissocyanatobiphenyl,
2,4-disocyanatobiphenyl,
4,4-diisocyanatobiphenyl,
3,3'-dimethoxy-4,4'-diisocyanatobiphenyl,
3,3'-dimethyl-4,4'-diisocyanatobiphenyl,
3,3'-dimethyl-4,4'-diisocyanatobiphenyl,
2-nitro-4,4'-diisocyanatobiphenyl,
bis(4-isocyanatophenyl)methane,
bis(2-methyl-4-isocyanatophenyl)methane,
2,2-bis(4-isocyanatophenyl)propane,
bis(2,5-dimethyl-4-isocyanatophenyl)methane,
cyclohexyl-bis(4-isocyanatophenyl)methane,
bis(3-methoxy-4-isocyanatophenyl)methane,
bis-(4-methoxy-3-isocyanatophenyl)methane,
bis(2-methyl-5-methoxy-4-isocyanatophenyl)methane,
2,2-bis(3-chloro-4-isocyanatophenyl)-propane,
2,2'-diisocyanatobenzophenone,
2,4-diisocyanatodibenzyl,
p-nitrophenyl-bis(4-isocyanatophenyl)methane,
phenyl-bis(2,5-dimethyl-4-isocyanatophenyl)methane,
2,7-diisocyanatofluorene,
2,6-diisocyanatophenanthroquinone,
3,6-diisocyanato-9-ethylcarbazole, 3,8-diisocyanatopyrene,
2,8-diisocyanatochrysene,
2,4-diisocyanatodiphenylsulfide,
bis(4-isocyanatophenyl)sulfide,
bis(4-isocyanatophenyl)sulfone,
bis(4-isocyanatobenzyl)sulfone,
2,4′-diisocyanato-4-methyldiphenylsulfone,
4-methyl-3-isocyanatobenzylsulfonyl-4′-isocyanatophenyl ester,
4-methoxy-3-isocyanatobenzylsulfonyl-4′-isocyanatophenyl ester,
bis(2-methyl-4-isocyanatophenyl)disulfide,
bis(3-methyl-4-isocyanatophenyl)-disulfide,
bis(4-methyl-3-isocyanatophenyl)disulfide,
bis(4-methoxy-3-isocyanatophenyl)disulfide,
bis(3-methoxy-4-isocyanatophenyl)disulfide,
4-methyl-3-isocyanatobenzylsulfonyl-4-isocyanato-3-methylanilide,
N,N′-bis(4-isocyanatobenzylsulfonyl)-1,2-diaminoethane,
bis(3-methoxy-4-isocyanatobenzyl)sulfone,
1,2-bis(4-methoxy-3-isocyanatobenzylsulfonyl)ethane,
N,N′-bis(4-methoxy-3-isocyanatobenzyl)-1,2-diaminoethane,
2,4,6-triisocyanatotoluene,
triisocyanatomesitylene,
1,3,7-triisocyanatonaphthalene,
2,4,4′-triiscoyanatodiphenylmethane,
bis(2,5-diisocyanato-4-methylphenyl)methane,
tris(4-isocyanatophenyl)-methane,
N,N′-bis(4-isocyanatophenyl)carbamyl acid chloride,
and the like.

Amine blocked isocyanates are made by the known reaction of an isocyanate with an amine as shown for example, in Organic Chemistry, Fieser and Fieser, p. 615, D.C. Heath and Co., Boston, 1944.

The amines used to form the amine-blocked polyisocyanates of this invention can be primary or secondary aliphatic, cycloaliphatic or aromatic amines. It is preferred to use amines which are neither too volatile nor too viscous or insoluble, that is, having about 3 to 20 carbon atoms. For economic reasons, it is further preferred to employ readily available primary aliphatic and aromatic amines, although secondary amines can be used, if desired. Thus, it is especially preferred to employ such primary aliphatic amines as n-butylamine or ethylenediamine. Other aliphatic primary amines which are useful in the present invention include: methylamine, ethylamine, propylamine, isopropylamine, allylamine, sec-butylamine, isobutylamine, n-butylamine, isoamylamine, ethylenediamine, 1,2-diaminopropane, 1,3-diaminopropane, 1-4-diaminobutane, 1,5-diaminopentane, benzylamine, α-phenylethylamine, β-phenylethylamine, and the like.

The primary aromatic amines worthy of special note are aniline and o-phenylenediamine. Other specific examples of useful primary aromatic amines include: aniline, o-toluidine, m-toluidine, p-toluidine, 2-amino-p-xylene, 4-amino-m-xylene, 2-aminodimethylaniline, o-anisidine, 5-amino-m-xylene, 3-amino-o-xylene, 4-amino-o-xylene, 4-amino-isopropylbenzene, o-phenetidine, o-phenylenediamine, β-naphthylamine and the like. Illustrative useful secondary amines are: dimethylamine, diethylamine, di-n-propylamine, piperidine, diallylamine, diisobutylamine, piperazine, methyl aniline, ethyl aniline, methyl-o-toluidine, methyl-m-toluidine, methyl-p-toluidine, isopropylaniline, diphenylamine, benzylaniline, dibenzylamine, methyl α-naphthylamine and the like.

The porportion of the components in the composition of this invention is not narrowly critical, but it is preferred that they be present in stoichiometric amounts. However, less than stoichiometric amounts of amine blocked polyisocyanate can be employed, for example, with the obvious result that not all of the hydroxyl groups of the polyhydroxyether will be cured or crosslinked. Greater than stoichiometric amounts of amine blocked polyisocyanate can also be used, but no particular advantage would be gained, since this would merely leave an excess of amine and polyisocyanate after all the polyhydroxyether hydroxyl groups had been crosslinked. By the same token, if the ratio of epoxy resin to amine blocked polyisocyanate is less than stoichiometric again residual amine is left in the cured system which while not fatal, will lower the tensile shear strength of the adhesive bond.

The temperature required for mixing the components of the curable composition is preferably below about 350° F. in a range sufficient to permit their being intimately blended into a homogeneous mass.

The preferred temperatures for curing the curable polyhydroxyether composition is about 450 to 550° F. although temperatures as low as about 400° F. and as high as about 650° F. can also be used, if desired.

The curing time is not narrowly critical and is determined largely by the curing temperature employed. Thus, the curing time can be diminished as the curing temperature is elevated and correspondingly increased as the curing temperature is lowered. For example, at a curing temperature of about 450° F. a curing time of about 10 to 15 minutes can be used while at about 500° F., about 3 to 8 minutes can be used.

Curing temperatures can be achieved by any convenient heating source well known in the art such as ovens, radiant heaters, gas or electric hot air torches, electric heating tapes, infrared lamps and the like.

The mixing or blending of the components of the curable polyhydroxyether composition can be carried out in any conventional mixing equipment known in the art such as roll mills, Banbury mixers, ribbon mixers, ball mills and the like.

Suitable substrates which can be adhesively bonded or coated with the cured polyhydroxyether composition of this invention include metals, such as chromium, aluminum alloys, copper, brass, magnesium, plain carbon steel, stainless steel and the like; and glass, brick and siliceous adherends.

Typical of the epoxy resins suitable for use with the thermoplastic polyhydroxyether composition are the polyglycidyl ethers of polyhydric phenols, and other epoxy resins having an epoxy equivalency greater than 1.0 as defined in U.S.P. 2,633,458. These organic monomeric or polymeric materials contain a minimum of two and suitably three or four and more epoxy groups, i.e.,

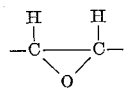

per molecule and can be saturated, unsaturated aliphatic, cycloaliphatic, aromatic, or heterocyclic and can be unsubstituted or substituted with, for example, hydroxyl groups, halogen atoms, ether radicals and the like. Among the suitable di- and polynuclear phenols suitable for preparation of polyglycidyl ethers are the bisphenols described by Bender et al. in U.S. Patent 2,506,486 and polyphenols such as the novolac condensation product of a phenol and a saturated or unsaturated aldehyde containing on an average of from 3 to 20 or more phenylol groups per molecule (cf. book by T.S. Carswell entitled "Phenoplasts," published in 1947 by Interscience Publishers of New York). Examples of suitable polyphenols derived from a phenol and an unsaturated aldehyde, such as acrolein, are the triphenylol, pentaphenylols and heptaphenylols described in U.S. Patent No. 2,801,989 and U.S. Patent No. 2,885,385 both by A. G. Farnham.

Generally, these polyglycidyl ethers of polyhydric phenols are prepared by the reaction of an epihalohydrin with a polyhydric phenol under basic conditions. The polyhydric phenol can be mononuclear such as resorcinol, catechol, methyl resorcinol or hydroquinone, or may be di- or polynuclear.

The polyhydric polynuclear phenols can consist of two or more phenols connected by such groups as alkylidene, alkylene, ether, ketone or sulfone. The connecting groups are further exemplified by the following compounds: bis(p - hydroxyphenyl)ether, bis(p - hydroxyphenyl)ketone, bis(p-hydroxyphenyl)methane, bis(p-hydroxyphenyl)dimethyl methane, bis(p-hydroxyphenyl) benzophenone, 1,5-dihydroxynaphthalene, bis(p-hydroxyphenyl)sulfone or a trisphenol or a tetraphenol, e.g., having the formulas:

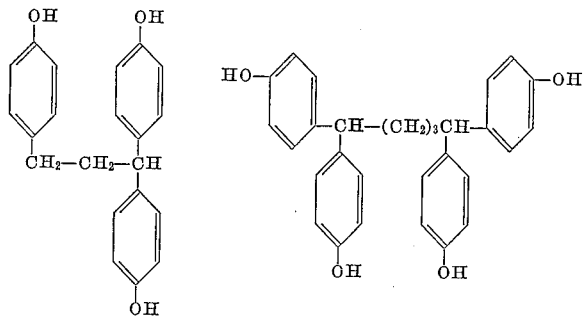

Preferred as the epihalohydrin for reaction with the above polyhydric phenols are epichlorohydrin, glycerol dichlorohydrin, 3-chloro-1,2-epoxy butane, 3-bromo-1,2-epoxy hexane, and 3-chloro-1,2-epoxyoctane.

Other polyepoxides such as bis(2,3-epoxycyclopentyl) ether, 3,4-epoxy-6-methylcyclohexylmethyl, 3,4-epoxy-6-methylcyclohexanecarboxylate, vinyl cyclohexene dioxide and dicyclopentadiene dioxide can also be used.

Other epoxy resins that can be employed herein are the epoxylated novolac resins. Novolac resins are prepared by the condensation of phenol with an aldehyde, or, more generally, by the reaction of a phenolic compound, having two or three reactive aromatic ring hydrogen positions, with an aldehyde or aldehyde-liberating compound capable of undergoing phenol-aldehyde condensation.

Illustrative of phenolic compounds are cresol, xylenol, ethylphenol, butylphenol, isopropylmethoxyphenol, chlorophenol, resorcinol, hydroquinone, naphthol, 2,2-bis(p-hydroxyphenol)propane, and the like. Illustrative of aldehydes are formaldehyde, acetaldehyde, acrolein, crotonaldehyde, furfural, and the like. Illustrative of aldehyde-liberating compounds are for example, paraformaldehyde, formalin and 1,3,5-trioxane. Ketones such as acetone are also capable of condensing with the phenolic compounds, as are methylene engendering agents such as hexamethylenetetramine.

The condensation reaction is conducted in the presence of an acidic catalyst using less than six moles of aldehyde per seven moles of phenol. The novolac resins thus produced are permanently fusible and soluble. When the condensation reaction is completed, if desired, the water and other volatile materials can be removed by distillation, and the catalyst neutralized. The novolac condensation products of phenol and formaldehyde are illustrated by the structures below:

(a)

(b)

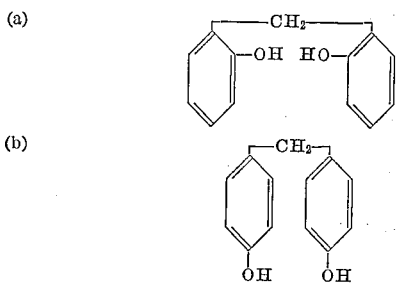

(c)

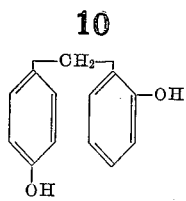

In a typical synthesis, novolacs are prepared by heating one mole of phenol with 0.8 mole of an aldehyde under acidic conditions. The temperature at which the reaction is conducted is generally from about 25° C. to about 175° C.

The epoxylated novolac resins used in this invention can be prepared by the epoxidation of the novolac by methods well known in the art, as for example, by reaction with an epihalohydrin as described in Epoxy Resins by H. Lee and K. Neville, McGraw Hill Book Co., 1957, N.Y.C. The epoxylated novolac resins have the general structure

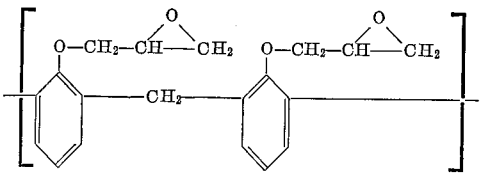

Epoxylated novolacs having 2.5 to 3 epoxy groups per molecule are preferred for use in the present invention, although those with a greater functionality can also be used if desired.

The following examples are illustrative of this invention. All amounts and percentages are by weight unless otherwise specified.

*Example 1.—Preparation of polyhydroxyether compositions*

The polyhydroxyether compositions described in this invention were formulated by first physically admixing the components on a two-roll mill until a homogeneous blend was obtained. The mixture was then sheeted off the mill and pressed at about 320° C. into sheets having a thickness of about 10 mils. These sheets can be stored at ambient temperatures without refrigeration or other special precautions until used.

*Example 2.—Adhesive evaluation of polyhydroxyether compositions*

An evaluation of the various polyhydroxyether compositions as adhesives was obtained by measuring the tensile lap shear strengths at 77° F. and 250° F. of aluminum specimens bonded with them. The ASTM D–1002 procedure was utilized using aluminum test specimens 4.0" x 1.0" x 0.064" fabricated from 2024–TS alclad aluminum sheets. These aluminum specimens after a chromic acid etch treatment were bonded with a ½" overlap and a glue line of about 0.002 inch by pressing the specimens with a strip of the polyhydroxyether composition sheet prepared as described in Example 1 sandwiched between them at about 500° F. for above five minutes. The bonded specimens were then aged for 24 hours at 50% relative humidity and then subjected to tensile shear in a Tinius Olsen Tensile Machine at either 77° F. or 250° F.

The results are delineated in the table below with the tensile lap shear strengths given in p.s.i.

The pressure used in bonding adherends with thermoplastic polyhydroxyether composition is not at all critical. Any pressures which are sufficient to hold the polyhydroxyether composition and adherends in a bonding relation are adequate. Thus, as little as 1 p.s.i. and as much as 1000 p.s.i. and more can be used. It is preferred to use bonding pressures of about 1 to 50 p.s.i.

TABLE

| Run No. | Parts by Weight | | | | | Tensile Shear Strength, p.s.i. | |
|---|---|---|---|---|---|---|---|
| | PHE [1] | n-Butylamine/TDI [2] (1:1) | Ethylene diamine/TDI [3] (1:1) | Epoxylated Novolac [4] | Epoxy Resin [5] | At 77° F. | At 250° F. |
| Control | 100 | | | | | 3,870 | 132 |
| 1 | 100 | 43.6 | | | | 3,330 | 168 |
| 2 | 100 | 43.6 | | 75.7 | | 3,600 | 973 |
| 3 | 100 | | 41.2 | | | 2,130 | 17 |
| 4 | 100 | | 41.2 | | 137 | 4,470 | 673 |
| 5 | 100 | | 41.2 | 151.0 | | 2,070 | 509 |

[1] Thermoplastic polyhydroxyether having an approximate molecular weight of 20,000 to 30,000, a specific gravity of 1.18 and a melt flow (g./10 min. at 220° F.) of 2.5 to 10, a softening point of 190° F., and a reduced viscosity (0.2 g./100 ml. of dimethyl formamide) of 0.4 to 0.6.
[2] Tolylene diisocyanate blocked with n-butyl amine.
[3] Tolylene diisocyanate blocked with ethylene diamine.
[4] From phenol.
[5] Liquid epoxy of bisphenol A (Epoxide equivalent=185-200).

From these data it can be readily seen that the presence of an epoxy containing compound greatly enhances tensile lap shear strength at 250° F. of the PHE based formulation. Thus, the incorporation of epoxylated novolac in Run No. 2 causes about a 6 fold increase in this value over a composition containing PHE and n-butylamine blocked TDI (Run No. 1) and greater than a 7 fold increase over PHE control. A similar enhancement of tensile lap shear strength at 250° F. was obtained by using an epoxy resin with a PHE-ethylenediamine blocked TDI composition (Run No. 4). Run No. 5 demonstrated this same improvement by employing epoxylated novolac with a PHE-ethylenediamine blocked TDI.

When p-phenylenediamine blocked TDI or benzylamine blocked dianisidine diisocyanate, are used with thermoplastic polyhydroxyether and epoxy resin, as described for bonding aluminum test specimens approximately the same tensile lap shear strengths are obtained.

The glue line is not narrowly critical although values of about 0.5 to 10 mils are preferred although lesser or greater glue lines can be used, if desired.

For etching aluminum specimens, the chromic acid bath consisted of a mixture of 900 cc. of concentrated sulfuric acid, 92 g. of $Na_2Cr_2O_7 \cdot 7H_2O$ and 458 cc. of water. The specimens were immersed in this mixture for 10 minutes at 150° F. and then rinsed in water.

Although the invention has been described in its preferred forms, it is understood that the present disclosure has been made only by way of example, and that numerous changes in the details may be resorted to without departing from the spirit and the scope of the invention.

What is claimed is:
1. A curable thermoplastic polyhydroxyether composition comprising:
    (a) a thermoplastic polyhydroxyether having the structure:

$$\pm D\!-\!O\!-\!E\!-\!O\!\pm_n$$

wherein D is the radical residuum of a dihydric phenol, E is an hydroxyl containing residuum of an epoxide and $n$ represents the degree of polymerization and is at least 30;
    (b) about a stoichiometric amount of an amine blocked polyisocyanate based on the weight of thermoplastic polyhydroxyether; and
    (c) a stoichiometric amount of an epoxy resin based on the weight of amine blocked polyisocyanate.
2. The cured composition claimed in claim 1.
3. The composition claimed in claim 1 wherein $n$ is at least 80, D is the residue of 2,2-bis(4-hydroxyphenyl)propane and E is the residue of epichlorohydrin.
4. The composition claimed in claim 1 wherein the amine is n-butylamine and the polyisocyanate is tolylene diisocyanate.
5. The composition claimed in claim 1 wherein the amine is ethylenediamine and the polyisocyanate is tolylene diisocyanate.
6. The composition claimed in claim 1 wherein the epoxy resin is derived from 2,2-bis(p-hydroxyphenyl)propane and epichlorohydrin.
7. The composition claimed in claim 1 wherein the epoxy resin is an epoxidized phenolic novolac.
8. The composition claimed in claim 1 wherein the curable thermoplastic polyhydroxyether, amine blocked polyisocyanate and epoxy resin are all present in essentially stoichiometric proportions.
9. The composition claimed in claim 4 wherein $n$ is at least 80.
10. The composition claimed in claim 7 wherein $n$ is at least 80.
11. A method for bonding adherends which comprises the steps of:
    (1) applying to said adherends a curable surface coating composition comprising:
        (a) a thermoplastic polyhydroxyether having the structure:

$$\pm D\!-\!O\!-\!E\!-\!O\!\pm_n$$

wherein D is the radical residuum of a dihydric phenol, E is an hydroxyl containing residuum of an epoxide, and $n$ represents the degree of polymerization and is at least 30;
        (b) about a stoichiometric amount of an amine blocked polyisocyanate based on the weight of thermoplastic polyhydroxyether; and
        (c) a stoichiometric amount of an epoxy resin based on the weight of amine blocked polyisocyanate
    (2) pressing the composition coated adherends together; and
    (3) heating the composition coated adherends under pressure to a curing temperature of at least about 400° F.
12. The method claimed in claim 11 wherein the curing temperature was about 400 to 650° F. and the curing time was about 1 to 15 minutes.
13. The method claimed in claim 11 wherein the curing temperature was about 450° F. to 550° F. and the curing time was about 3 to 8 minutes.
14. The method claimed in claim 11 wherein the pressure was about 1 to 50 p.s.i.
15. The method claimed in claim 11 wherein $n$ is at least 80, D is the residue of 2,2-bis(4-hydroxyphenyl)propane and E is the residue of epichlorohydrin.
16. The method claimed in claim 11 wherein the amine is n-butylamine and the diisocyanate is tolylene diisocyanate.

17. The method claimed in claim 11 wherein $n$ is at least 80.

18. The method claimed in claim 11 wherein the curable thermoplastic polyhydroxyether, amine blocked polyisocyanate and epoxy resin are all present in essentially stoichiometric proportion.

19. The method claimed in claim 11 wherein the adherends are aluminum.

References Cited by the Examiner

UNITED STATES PATENTS

| | | | |
|---|---|---|---|
| 2,602,075 | 7/1952 | Carpenter | 260—47 |
| 3,177,090 | 4/1965 | Bayes | 260—47 |

MURRAY TILLMAN, *Primary Examiner.*

P. LIEBERMAN, *Assistant Examiner.*